April 14, 1931.  J. B. REPLOGLE  1,800,753
COUPLING
Filed July 29, 1929

Inventor
JAMES B. REPLOGLE
By Wayne M. Hart,
Attorney

Patented Apr. 14, 1931

1,800,753

UNITED STATES PATENT OFFICE

JAMES B. REPLOGLE, OF DETROIT, MICHIGAN, ASSIGNOR TO JAMES B. REPLOGLE LABORATORIES, INC., OF BOSTON, MASSACHUSETTS, A CORPORATION OF MASSACHUSETTS

COUPLING

Application filed July 29, 1929. Serial No. 381,829.

This invention relates to couplings and more particularly to couplings for use with refrigerating systems.

Difficulty is experienced with refrigerating systems because of several causes such as careless installation, vibration, abuse and internal pressure, the joints formed by coupling tubes or conduits with each other or other parts of the apparatus becomes loose permitting escape of the refrigerant gas. Such leaks are annoying but can be readily detected with some refrigerants, for instance by the mutual reaction of sulphur dioxide and ammonia, but with methyl chloride there is no chemical or other simple test for detecting leaks. It is known that compressed air can be applied to the interior of the units comprising systems using methyl chloride because when submerged bubbles will rise to the surface in case of a leak, but such a test can not well be applied to a system when the units are assembled and there has been leakage at the joints connecting tubing with the units, so that as a result this chemical has had only a limited use with refrigerating systems.

An object of the invention is to overcome the above objections to certain refrigerants through the provision of leak proof joints in the systems.

Another object of my invention is to provide a coupling for refrigerating systems which can be readily assembled to maintain leak proof joints.

Still another object of the invention is to provide a coupling which is impervious to high pressure gases.

Other objects of the invention will become apparent as the description of the invention progresses.

Figure 1:
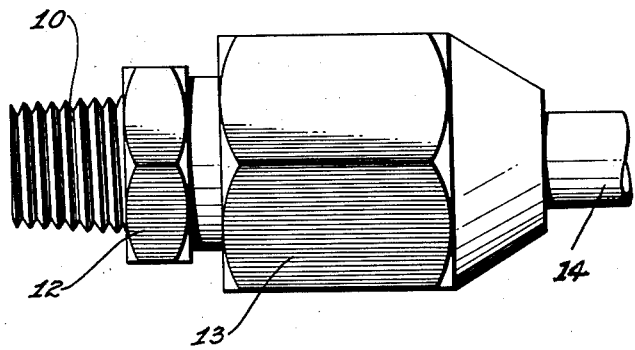
Figure 2:
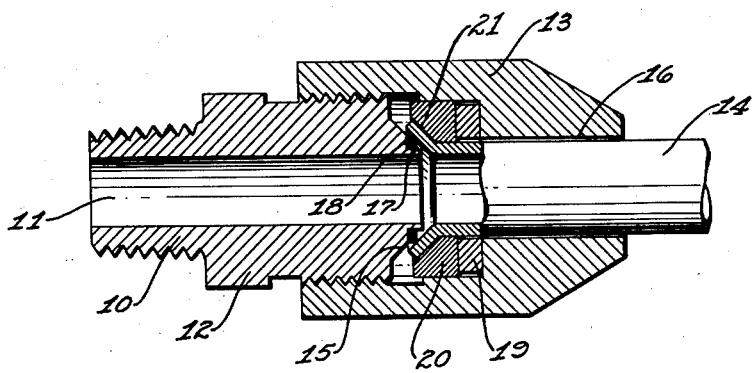
Figure 3:
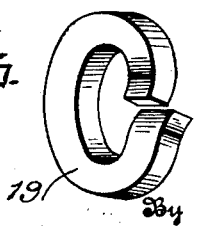

In the accompanying drawings, Fig. 1 is a side elevation of a coupling incorporating my invention; Fig. 2 is a medial sectional view of the same. Fig. 3 is a perspective view of the split washer.

Referring now to the drawings by characters of reference, 10 represents a plug or male member having a threaded periphery and a longitudinally extending passage therethrough, there being also a central hexagonal portion 12 for the application of a wrench. A cap nut or female member 13 is arranged to be screwed upon one end of the plug to clamp the flared end of the copper tube 14 against the conical wall 15 adjacent one end of the plug. The cap nut is provided with a longitudinally extending recess, one end 16 of which is substantially the same diameter as the tube which extends therethrough while the other end thereof is of larger diameter.

At the conical end of the plug is formed a cylindrical neck 17 upon which is placed a ring or washer 18. This ring is formed of lead, celluloid or some similar material having the property of cold flowing indefinitely under pressure. The volume of the ring is approximately cut out of material of twice that removed from the tapered end to form the cylindrical neck 17 so that half of the ring can dispose itself between the conical wall of the plug and the flared end of the tube.

A split spring lock washer 19 is arranged in the base of the enlarged end of the passage in the cap nut, and adjacent thereto is provided a circular sleeve member 20. The sleeve member and washer encircle the tube, and the sleeve member is formed with an interiorly tapered end 21 which engages the exterior of the flared end of the tube.

As the cap nut is screwed upon the tapered end of the plug, the flared end of the tube will be pressed against the ring packing member 18 causing a circular line contact which is sufficient to prevent leakage, especially in view of the thrust action of the spring washer to maintain such contact. As the cap nut is screwed further on the plug, the pressure will cause deformation or flow of the packing ring which because of its character forms a packing between the conical face of the plug and the tube flare. The character of the ring is such that it will fill any surface cavities in either the tube flare or the conical wall of the plug, thus insuring absolute tightness of the joint. Should the flow of the ring continue, due to pressure thereon, then the lock washer will maintain the thrust of the sleeve member against the tube flare so that there will be no separation and consequent leakage.

With the coupling described, there can be no leakage after the cap is once screwed on the plug enough to cause the tube flare to engage the packing ring. Such coupling is useful with all refrigerating systems to form joints which will not leak, and permits the use of methyl chloride or other hydro-carbon refrigerants which have had little use heretofore because of leakage through the joints of apparatus which could not be detected without expensive and impossible commercially testing.

Various changes can be made in the device described without departing from the spirit of my invention and the scope of the claim.

What I claim is:

In a coupling, a male member having a conical end, a tube having a flared end adapted to parallel the conical end of the male member, a deformable sealing ring intermediate the male member and the tube flare, a cap nut surrounding the flared end of the tube and adapted to be screwed on the conical end of the male member, an axially movable sleeve member surrounding the flared end of the tube within the cap nut, and a spring in the cap nut exerting pressure against the sleeve member to cause a tight contact between the tube flare and the sealing ring.

In testimony whereof, I hereunto affix my signature this 18th day of July, 1929.

JAMES B. REPLOGLE.